US009385377B2

(12) United States Patent
Kaneko et al.

(10) Patent No.: US 9,385,377 B2
(45) Date of Patent: Jul. 5, 2016

(54) METHOD FOR PRODUCING A CATALYST FOR FUEL CELLS
(71) Applicants: TOYOTA JIDOSHA KABUSHIKI KAISHA, Toyota-shi, Aichi-ken (JP); AUDI AG, Ingolstadt (DE)
(72) Inventors: Keiichi Kaneko, Susono (JP); Naoki Takehiro, Shizuoka-ken (JP); Takumi Taniguchi, Susono (JP); Tatsuya Arai, Susono (JP); Noriyuki Kitao, Shizuoka-ken (JP); Makoto Adachi, Numazu (JP); Hiroko Kimura, Susono (JP)
(73) Assignees: TOYOTA JIDOSHA KABUSHIKI KAISHA, Toyota-Shi (JP); AUDI AG, Ingolstadt (DE)
( * ) Notice: Subject to any disclaimer, the term of this patent is extended or adjusted under 35 U.S.C. 154(b) by 0 days.
(21) Appl. No.: 14/440,453
(22) PCT Filed: Nov. 7, 2012
(86) PCT No.: PCT/JP2012/079446
§ 371 (c)(1),
(2) Date: May 4, 2015
(87) PCT Pub. No.: WO2014/073114
PCT Pub. Date: May 15, 2014
(65) Prior Publication Data
US 2015/0318560 A1 Nov. 5, 2015
(51) Int. Cl.
*B01J 23/00* (2006.01)
*H01M 4/92* (2006.01)
(Continued)
(52) U.S. Cl.
CPC ............ *H01M 4/925* (2013.01); *H01M 4/8657* (2013.01); *H01M 4/8878* (2013.01);
(Continued)
(58) Field of Classification Search
CPC . H01M 4/925; H01M 4/8878; H01M 4/8885; H01M 4/921; H01M 4/926; H01M 4/8657
USPC ................... 502/325; 429/524, 506
See application file for complete search history.

(56) References Cited
U.S. PATENT DOCUMENTS

2006/0134505 A1* 6/2006 Wang ...................... B22F 1/025
429/506
2006/0135359 A1 6/2006 Adzic et al.
(Continued)

FOREIGN PATENT DOCUMENTS

EP          1524711 A2     4/2005
JP       2005228673 A      8/2005
(Continued)

OTHER PUBLICATIONS

Vismadeb Mazumder et al: "Core/Shell Pd/FePt Nanoparticles as an Active and Durable Catalyst for the Oxygen Reduction Reaction", Journal of the American Chemical Society, vol. 132, No. 23 (Jun. 16, 2010), pp. 7848-7849.

*Primary Examiner* — Colleen Dunn
*Assistant Examiner* — Haytham Soliman
(74) *Attorney, Agent, or Firm* — Kenyon & Kenyon LLP

(57) ABSTRACT

An object of the present invention is to provide a production method which can increase the activity of a catalyst particle comprising a core particle and an outermost layer, the core particle comprising at least one of palladium and a palladium alloy, and the outermost layer comprising at least one of platinum and a platinum alloy and covering the core particle. The method is for producing a catalyst for fuel cells, in which a catalyst particle is supported by an electroconductive carrier, the method comprising the steps of: preparing a supported catalyst in which a catalyst particle comprising a core particle and an outermost layer is supported by an electroconductive carrier, the core particle comprising at least one of palladium and a palladium alloy, and the outermost layer comprising at least one of platinum and a platinum alloy and covering the core particle; acid treatment to bring the supported catalyst into contact with an acid solution which dissolves palladium more preferentially than platinum; and firing the supported catalyst at 80° C. or more and less than 200° C. in a reducing gas atmosphere after the acid treatment step.

5 Claims, 5 Drawing Sheets

(51) Int. Cl.
 H01M 4/86 (2006.01)
 H01M 4/88 (2006.01)
 H01M 8/10 (2016.01)

(52) U.S. Cl.
 CPC ............ H01M4/8885 (2013.01); H01M 4/921 (2013.01); H01M 4/926 (2013.01); H01M 4/8828 (2013.01); H01M 2008/1095 (2013.01); Y02E 60/50 (2013.01)

(56) References Cited

U.S. PATENT DOCUMENTS

| | | |
|---|---|---|
| 2008/0090128 A1 | 4/2008 | Saito et al. |
| 2010/0233574 A1 | 9/2010 | Masao et al. |
| 2012/0010069 A1 | 1/2012 | Takehiro et al. |
| 2012/0208105 A1* | 8/2012 | Arai ...................... H01M 4/926 429/524 |
| 2014/0178575 A1 | 6/2014 | Iio et al. |

FOREIGN PATENT DOCUMENTS

| | | | |
|---|---|---|---|
| JP | 2006-179427 A | 7/2006 | |
| JP | 2012-016684 A | 1/2012 | |
| WO | 2009/060582 A1 | 5/2009 | |
| WO | WO 2012011170 A1 * | 1/2012 | ............ H01M 4/921 |
| WO | 2012/115624 A1 | 8/2012 | |
| WO | 2012105107 A1 | 8/2012 | |

* cited by examiner

METHOD FOR PRODUCING A CATALYST FOR FUEL CELLS

CROSS-REFERENCE TO RELATED APPLICATION

This is a national phase application based on the PCT International Patent Application No PCT/JP2012/079446 filed Nov. 7, 2012, the entire contents of which are incorporated herein by reference.

TECHNICAL FIELD

The present invention relates to a method for producing a catalyst for fuel cells. More specifically, it relates to a method for producing a catalyst for fuel cells, which comprises catalyst particles having a so-called core-shell structure.

BACKGROUND ART

A fuel cell converts chemical energy directly into electric energy by supplying a fuel and an oxidant to two electrically-connected electrodes and thus causing electrochemical oxidation of the fuel. Unlike thermal power generation, a fuel cell is not limited by the Carnot cycle; therefore, it shows high energy conversion efficiency. A fuel cell is generally constituted of a stack of single cells, each of which comprises a membrane electrode assembly as the basic structure, in which an electrolyte membrane is sandwiched between a pair of electrodes.

Noble metal catalysts such as a platinum catalyst and a platinum alloy catalyst have been used as the catalyst of the anode and cathode electrodes of a fuel cell. However, noble metal catalysts are scarce resources and it is expensive to use them for large-scale commercial production of fuel cells.

Meanwhile in noble metal catalyst particles, catalytic reaction occurs on the surface of the particles only and the inside of the particles seldom participates in catalytic reaction. Therefore, the catalytic activity per unit mass of a noble metal catalyst particle is not always high.

Catalyst particles having such a structure that a core particle is covered with an outermost layer, that is, a so-called core-shell structure, are known as a technique which can increase the catalytic activity per unit mass of a noble metal catalyst. Catalyst particles having a core-shell structure can secure catalytic activity and cost reduction by using a material with excellent catalytic activity (such as noble metal) as the outermost layer and a relatively inexpensive material which does not directly participate in catalytic reaction as the core particle.

As the method for producing catalyst particles having a core-shell structure, there may be mentioned a method disclosed in Patent Literature 1. The method disclosed in Patent Literature 1 is a method for producing an electrode catalyst for fuel cells, comprising the steps of using specific particles as the core portion and covering the core portion with a shell portion. In Patent Literature 1, it is explained that filtration, washing, etc., of core-shell type metal nanoparticles can be conducted after the step of covering the core portion with the shell portion, and suction filtration with water, perchloric acid, dilute sulfuric acid, dilute nitric acid or the like is mentioned as a concrete method of the filtration and washing.

Patent Literatures 2 and 3 disclose methods for producing a catalyst for fuel cells, which are not the method of producing catalyst particles having a core-shell structure.

CITATION LIST

Patent Literature 1: Japanese Patent Application Laid-Open (JP-A) No. 2012-16684

Patent Literature 2: International Publication No. WO2009/060582

Patent Literature 3: JP-A No. 2006-179427

SUMMARY OF INVENTION

Technical Problem

A catalyst having a core-shell structure is problematic in that the catalyst does not exhibit an expected, sufficient high activity when it is in the initial state just after the synthesis. One of the reasons for the problem is that core particles which are not sufficiently covered with an outermost layer, are produced upon the synthesis.

Also in the case where the catalyst having a core-shell structure is, as Patent Literature 1, brought into contact with an acid solution, there is a problem that an oxide coating is formed on the surface of the catalyst, resulting in a decrease ineffective surface area and thus a decrease in activity. Once the oxide coating is formed, the catalyst takes time to exhibit sufficient catalytic activity, resulting in a decrease in fuel cell performance.

The present invention was accomplished in view of the above circumstances. An object of the present invention is to provide a method for producing a catalyst for fuel cells, which comprises a catalyst particle having a core-shell structure, more specifically, a production method which can increase the activity of a catalyst particle comprising a core particle and an outermost layer, the core particle comprising at least one of palladium and a palladium alloy, and the outermost layer comprising at least one of platinum and a platinum alloy and covering the core particle.

Solution to Problem

The method for producing a catalyst for fuel cells according to the present invention is a method for producing a catalyst for fuel cells, in which a catalyst particle is supported by an electroconductive carrier, the method comprising the steps of:

preparing a supported catalyst in which a catalyst particle comprising a core particle and an outermost layer is supported by an electroconductive carrier, the core particle comprising at least one of palladium and a palladium alloy, and the outermost layer comprising at least one of platinum and a platinum alloy and covering the core particle (hereinafter the catalyst particle may be referred to as Pt/Pd catalyst particle);

acid treatment to bring the supported catalyst into contact with an acid solution which dissolves palladium more preferentially than platinum; and firing the supported catalyst at 80° C. or more and less than 200° C. in a reducing gas atmosphere after the acid treatment step.

According to the catalyst production method of the present invention, in the Pt/Pd catalyst particle, it is possible to mend a region of the palladium-containing core particle, which is not covered with the platinum-containing outermost layer (hereinafter the region may be referred to as "defective region"), by the acid treatment step. Moreover, according to the catalyst production method of the present invention, it is possible to remove an oxide coating by the firing step, which was formed on the catalyst particle surface by the acid treatment step, with maintaining the core-shell structure, as well as to cause surface diffusion of the platinum, which forms the outermost layer, and stabilize the same. Therefore, according to the present invention, it is possible to increase the activity of the catalyst particle.

The method for producing the catalyst for fuel cells according to the present invention, preferably further comprises the step of bubbling a hydrogen gas into a solution in which the supported catalyst is dispersed, after the acid treatment step and before the firing step. This is because it is possible to remove the oxide coating efficiently in the firing step.

As the solution in which the supported catalyst is dispersed is an acid solution in the bubbling step, there may be used an acid solution, for example.

As the acid solution in the acid treatment step, for example, there may be mentioned one which contains at least one kind of acid selected from the group consisting of nitric acid, sulfuric acid, perchloric acid, hydrochloric acid and hypochlorous acid.

Also, the acid solution is preferably heated to 40 to 90° C. in the acid treatment step.

Advantageous Effects of Invention

According to the method for producing a catalyst for fuel cells of the present invention, it is possible to increase the activity of a catalyst particle comprising a core particle and an outermost layer, the core particle comprising at least one of palladium and a palladium alloy, and the outermost layer comprising at least one of platinum and a platinum alloy and covering the core particle.

DESCRIPTION OF EMBODIMENTS

Figure 1:
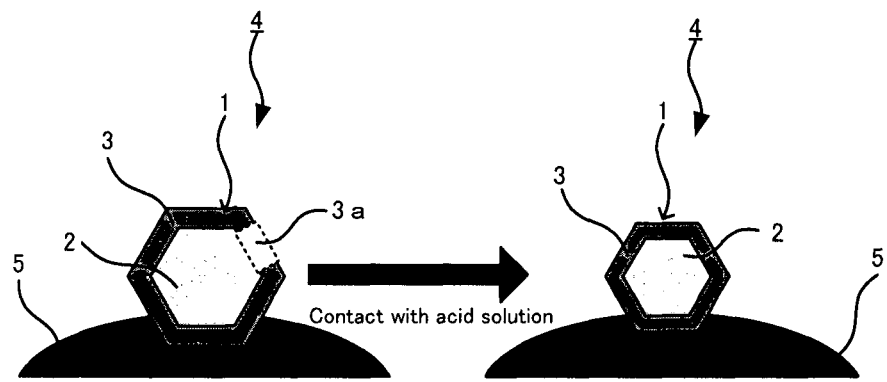
FIG. 1 is a schematic sectional view showing the mending of a defective region of a catalyst particle by acid treatment in the present invention.

The method for producing a catalyst for fuel cells according to the present invention is a method for producing a catalyst for fuel cells, in which a catalyst particle is supported by an electroconductive carrier, the method comprising the steps of:

preparing a supported catalyst in which a catalyst particle comprising a core particle and an outermost layer is supported by an electroconductive carrier, the core particle comprising at least one of palladium and a palladium alloy, and the outermost layer comprising at least one of platinum and a platinum alloy and covering the core particle;

acid treatment to bring the supported catalyst into contact with an acid solution which dissolves palladium more preferentially than platinum; and firing the supported catalyst at 80° C. or more and less than 200° C. in a reducing gas atmosphere after the acid treatment step.

In the catalyst particle in which the core particle comprising at least one of palladium (Pd) and a palladium alloy (Pd alloy) (hereinafter the core particle may be referred to as "Pd core") is covered with the outermost layer comprising at least one of platinum (Pt) and a platinum alloy (Pt alloy) (hereinafter the outermost layer may be referred to as "Pt shell"), a defective region where the Pd core is not sufficiently covered with the Pt shell can occur upon the synthesis. The Pt/Pd catalyst particle having such a defective region is problematic in that it cannot provide sufficient catalytic performance in the initial state after the synthesis.

As the method for improving the low activity of such Pt/Pd catalyst particle in the initial state, for example, there may be mentioned a method for mending the defective region by, after a membrane electrode assembly or fuel cell is produced with the Pt/Pd catalyst particle, applying a potential cycle thereto or conducting pre-conditioning operation of the fuel cell.

However, upon the applying of a potential cycle or the pre-conditioning operation of the fuel cell, Pd is eluted from the Pd core and the eluted Pd becomes a contamination inside the fuel cell, so that there is concern that the performance of the fuel cell is affected.

Also, there may be mentioned a method for improving the initial activity by, before a membrane electrode assembly or fuel cell is produced, performing an acid treatment in advance on the Pt/Pd catalyst particle, using a specific acid solution. As well as the pre-conditioning operation, this acid treatment is effective in eluting Pd from the Pd core and mending the defective region. Moreover, it has the advantage of being able to prevent contamination of the inside of the fuel cell.

However, as a result of researches made by the inventors of the present invention, it was found that an oxide coating is formed on the surface of the Pt/Pd catalyst particle by an acid treatment, resulting in a decrease in the effective surface area of the catalyst particle and thus a decrease in the catalytic performance of the catalyst particle, especially a decrease in the initial activity of the same. Once the oxide coating is formed, the catalyst takes time to exhibit sufficient catalytic activity, resulting in a decrease in fuel cell performance.

As a result of diligent researches, the inventors of the present invention found that a highly active Pt/Pd catalyst particle can be obtained in such a manner that a Pt/Pd catalyst particle is brought into contact with an acid solution which dissolves Pd more preferentially than Pt to mend the defective region on which the Pd core is exposed; thereafter, the Pt/Pd catalyst particle is fired at a temperature of 80° C. or more and less than 200° C. in a reducing gas atmosphere. Based on this finding, the inventors completed the present invention.

A mechanism for highly activating the Pt/Pd catalyst particle according to the present invention, is considered as follows.

First, as shown in FIG. 1, Pt/Pd catalyst particle 1 having defective region 3a where Pd core 2 is not covered with Pt shell 3, is brought into contact with an acid solution which dissolves Pd more preferentially than Pt, thereby eluting Pd from Pd core 2 exposed on defective region 3a. Pd core 2 from which Pd has been eluted, is changed to a particle having a smaller diameter than the diameter before the elution of Pd. Along with this, Pt shell 3 covering the surface of Pd core 2 also shifts. At this time, the elution of Pd occurs more preferentially than elution of Pt; therefore, there is an increase in the coverage of smaller-diametered Pd core 2 with Pt shell 3, so that the defective region can be mended. Also in the present invention, because the Pt/Pd catalyst particle is brought into contact with the acid solution in the state of being supported by electroconductive carrier 5, that is, because supported catalyst 4 is brought into contact with the acid solution, aggregation of Pt/Pd catalyst particles 1 by the contact with the acid solution, is inhibited and the surface area of Pt/Pd catalyst particle 1 is secured.

Figure 2:
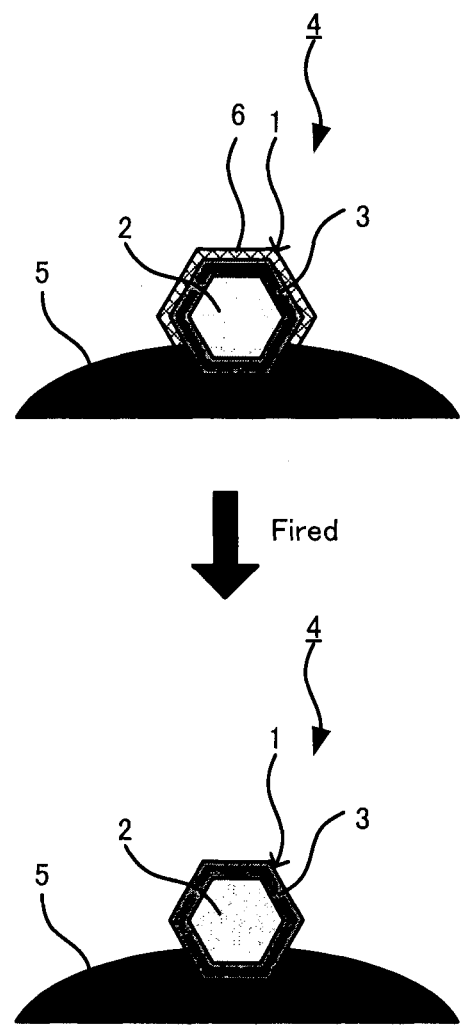
FIG. 2 is a schematic sectional view showing the removal of an oxide coating on a catalyst particle by firing in the present invention.

Next, as shown in FIG. 2, oxide coating 6 formed on the surface of Pt/Pd catalyst particle 1 by the acid treatment step can be removed by firing the Pt/Pd catalyst particle at 80° C. or more and less than 200° C. in a reducing gas atmosphere.

Setting the firing temperature to 80° C. or more allows surface diffusion of Pt, which forms the outermost layer, and allows the Pt shell to change into a smooth, more stable structure. It is possible to calculate by energy optimization by first-principle calculations, that the temperature at which Pt cause surface diffusion, is 80° C. or more.

Setting the firing temperature to less than 200° C. allows prevention of alloying of Pt and Pd in the Pt/Pd catalyst particle and allows the Pt/Pd catalyst particle to maintain the core-shell structure. By maintaining the core-shell structure, the activity per unit mass of Pt can be secured.

Hereinafter, the catalyst production method of the present invention will be explained in order.

[Preparation Step]

The preparation step is a step of preparing a supported catalyst in which a catalyst particle (Pt/Pd catalyst particle) comprising a core particle comprising at least one of palladium and a palladium alloy (Pd core) and an outermost layer comprising at least one of platinum and a platinum alloy and covering the core particle (Pt shell), is supported by an electroconductive carrier.

The supported catalyst in which the Pt/Pd catalyst particle is supported by an electroconductive carrier, can be a commercially available product or a previously synthesized one.

The method for synthesizing the supported catalyst in which the Pt/Pd catalyst particle is supported by an electroconductive carrier, is not particularly limited, and the supported catalyst can be produced by known methods. For example, it can be synthesized by forming a Pt shell on a Pd particle, which is supported by an electroconductive carrier, by a known method. Or, it can be synthesized by allowing an electroconductive carrier to support a Pd particle by a known method and then forming a Pt shell on the surface of the Pd particle by a known method. Here, "Pd particle" forms a Pd core, and it is a particle which comprises at least one of Pd and a Pd alloy.

The Pt/Pd catalyst particle supported by the electroconductive carrier comprises a Pd core and a Pt shell covering the Pd core.

Herein, "Pt shell covers/covering Pd core" includes not only the case where Pt shell entirely covers Pd core, but also the case where Pd core is partly covered with Pt shell and exposed.

The average particle diameter of the Pt/Pd catalyst particles prepared is not particularly limited. For example, it is preferably 3 to 10 nm, particularly preferably 4 to 6 nm.

In the present invention, the average particle diameter of particles is calculated by a conventional method. The method for calculating the average particle diameter of particles is as follows. First, the particle diameter of a particle shown in a TEM (transmission electron microscope) image at a magnification of 400,000 or 1,000,000 times is calculated, provided that the particle is spherical. Such a particle diameter calculation by TEM observation is performed on 200 to 300 particles of the same type, and the thus-obtained average of the particles is deemed as the average particle diameter.

The Pd core which constitutes the Pt/Pd catalyst particle, comprises at least one of Pd and a Pd alloy.

Examples of the at least one metal component contained in the Pd alloy other than Pd, include cobalt, nicked and iron. In the Pd alloy, the content of Pd is preferably 80 mol % or more, particularly preferably 90 mol % or more, from the viewpoint of matching with the platinum shell in atomic size.

The average particle diameter of the Pd core is not particularly limited. However, it is preferably 3 to 10 nm, and particularly preferably 4 to 6 nm, from the point of view that the surface area per unit mass of Pd constituting the Pd core, is large.

The Pt shell which constitutes the Pt/Pd catalyst particle, comprises at least one of Pt and a Pt alloy.

Examples of the at least one metal component contained in the Pt alloy other than Pt, include iridium, nickel, iron and cobalt. In the Pt alloy, the content of Pt is preferably 90 mol % or more, particularly preferably 95 mol % or more, from the viewpoint of the activity to oxygen reduction reaction.

The thickness of the Pt shell is not particularly limited. However, the Pt shell is preferably a monoatomic layer, from the point of view that the surface area per unit mass of Pt constituting the Pt shell, is large.

As explained above, the method for synthesizing the Pt/Pd catalyst particle is not limited. However, a method for covering the Pd core with the Pt shell through 2 steps, will be explained below in brief.

An example of the two-step method comprises at least the steps of covering a Pd particle with a monoatomic layer and replacing the monoatomic layer with Pt. In particular, there may be mentioned a method in which a monoatomic layer is formed in advance on the surface of a Pd particle by under-potential deposition, and then the monoatomic layer is replaced with Pt. When the outermost layer contains Pt, it is preferable to use Cu-UPD as the underpotential deposition, because the coverage of the Pd core with the Pt shell is high, and a Pt/Pd catalyst particle with excellent durability can be produced.

Hereinafter, an example of the Cu-UPD will be explained in detail.

First, a supported catalyst powder in which a Pd particle is supported by an electroconductive carrier (hereinafter may be referred to as Pd/C), is dispersed in water and then filtrated to obtain a Pd/C paste, and the paste is applied to a working electrode of an electrochemical cell. The Pd/C paste can be attached onto a working electrode by using an electrolyte resin such as Nafion (trademark) as a binder. As the working electrode, platinum mesh or glassy carbon can be used.

Next, the copper solution is introduced into the electrochemical cell. The working electrode, a reference electrode and a counter electrode are immersed in the copper solution, and a monoatomic layer of copper is deposited on the surface of the Pd particle by Cu-UPD. For the Cu-UPD, an example of detailed conditions is shown below.

Copper solution: A mixed solution of 0.05 mol/L $CuSO_4$ and 0.05 mol/L $H_2SO_4$ Atmosphere: In a nitrogen atmosphere (Nitrogen is bubbled into the copper solution.)

Sweep rate: 0.2 to 0.01 mV/sec

Potential: After the potential is swept from 0.8 V (vs. RHE) to 0.4 V (vs. RHE), it is fixed at 0.4 V (vs. RHE).

Potential fixing time: 30 minutes

After the potential fixing time has passed, the working electrode is immediately immersed in a platinum solution for displacement plating of copper with platinum, using their difference in ionization tendency. It is preferable to perform the displacement plating in an inert atmosphere such as a nitrogen atmosphere. The platinum solution is not particularly limited. However, there may be used a platinum solution of $K_2PtCl_4$ dissolved in 0.1 mol/L $HClO_4$. The platinum solution is sufficiently stirred, and nitrogen is bubbled into the solution. The displacement plating time is preferably 90 minutes or more.

A Pt/Pd catalyst particle can be obtained by the displacement plating, in which a monoatomic layer of Pt is deposited on the surface of each Pd core.

In the present invention, the Pt/Pd catalyst particle is supported by an electroconductive carrier.

The electroconductive carrier is not particularly limited as long as it has a specific surface area which is sufficient to support the Pt/Pd catalyst particles in a highly dispersed state and it has sufficient electroconductivity as a collector.

Examples of the electroconductive carrier include electroconductive carbon and metals. Preferred is electroconductive carbon.

In particular, those usable as the electroconductive carbon include the following, for example: carbon black such as acetylene black, furnace black, activated carbon, mesophase carbon, graphite, channel black and thermal black; activated carbon obtained by carbonizing a material containing various kinds of carbon atoms and performing an activating treatment thereon; those mainly consisting of carbon such as graphitized carbon; carbon fibers; porous carbon fine particles; carbon nanotubes; and carbon porous materials. Of them, preferred are carbon black such as acetylene black, furnace black, activated carbon, mesophase carbon and graphite, because the Pt/Pd catalyst particles can be supported in a highly dispersed state.

As the metals, for example, there may be mentioned stable metal oxides such as TiOx and RuOx.

The electroconductive carrier preferably has a BET specific surface area of 100 to 2000 m$^2$/g, particularly preferably 200 to 1600 m$^2$/g. This is because the electroconductive carrier having a BET specific surface area in this range can support the Pt/Pd catalyst particles in a highly dispersed state.

The electroconductive carrier is allowed to control the hydrophilicity and/or hydrophobicity of the surface of the carrier or the carrier itself, in view of the dispersion of the catalyst into an organic or aqueous phase in the process of producing the catalyst or fuel cell.

[Acid Treatment Step]

The acid treatment step is a step of bringing the supported catalyst in which the Pt/Pd catalyst particle is supported by an electroconductive carrier (hereinafter may be referred to as "supported catalyst") into contact with an acid solution which dissolves palladium more preferentially than platinum.

The acid solution used in the present invention is one which dissolves palladium more preferentially than platinum. It has oxidation power which is sufficient to elute palladium, and it can minimize platinum elution.

In general, the solubility of an elemental metal is determined by the ionization tendency of the elemental metal, that is, the standard electrode potential $E^0$ (that is, electrode potential in an aqueous solution at 25° C. and pH=0) of the elemental metal. While the standard electrode potential $E^0_{Pd}$ of palladium is +0.915 V (vs. SHE), the standard electrode potential $E^0_{Pt}$ of platinum is +1.188V (vs. SHE). Therefore, the ionization tendency of palladium is larger than that of platinum.

However, the ionization tendency by the standard electrode potential $E^0$ is limited to the inside of the aqueous solution at 25° C. and pH=0, and it is also a value that a metal in a bulk state has. Therefore, it is just a rough indication, and it is not always possible to selectively elute palladium than platinum, depending on the treatment conditions such as temperature and acid concentration. Since the dissolution-deposition reaction is an equilibrium reaction, it is not always true that platinum never elutes even in an ideal acid solution. Also, the Pt/Pd catalyst particle has a nanoscale size, so that the actual Pt elution potential or Pd elution potential is lower than the standard electrode potential $E^0$. Therefore, it is preferable to determine the acid treatment conditions (type of acid, concentration of acid, temperature, time, etc.) by considering beforehand the amount of Pd eluted from the Pt/Pd catalyst particles actually used and that of Pt shells eluted from the same.

In particular, the acid solution used in the present invention preferably has an oxidation-reduction potential which is a value around the palladium elution potential, 0.915 V (vs. SHE), and less than the platinum elution potential, 1.188 V (vs. SHE).

Concrete examples of the acid solution include nitric acid, sulfuric acid, perchloric acid, hydrochloric acid and hypochlorous acid. From the viewpoint of having oxidation power which is sufficient to dissolve palladium, nitric acid is particularly preferred.

The detailed conditions of the acid treatment, such as the concentration of the acid solution, the temperature of the same and the contact time with the acid solution, are preferably determined so that the ratio of the mass of the Pt shell eluted by the acid solution, Ms, to the mass of the Pd core eluted by the acid solution, Mc (hereinafter the ratio may be referred to as "Ms/Mc ratio") becomes 0.4 to 2.0, particularly preferably 0.5 to 1.5. When the Ms/Mc ratio is less than 0.4, the amount of Pd eluted from the Pd core is too large, resulting in a possible decrease in production efficiency. When the Ms/Mc ratio is more than 2.0, the elution amount of the Pd core is too small, resulting in a possible failure to obtain the defective region mending effects, or the elution amount of the Pt shell is too large, resulting in a possible decrease in catalytic activity.

In particular, the concentration of the acid solution is as follows. For example, in the case of using nitric acid as the acid solution, the concentration of the nitric acid is preferably $1.0 \times 10^{-4}$ to 2 mol/L, more preferably $1.0 \times 10^{-3}$ to 1 mol/L, still more preferably $1.0 \times 10^{-2}$ to $1.0 \times 10^{-1}$ mol/L. In the case of using sulfuric acid as the acid solution, the concentration of the sulfuric acid is preferably $1.0 \times 10^{-4}$ to 2 mol/L, more preferably $1.0 \times 10^{-3}$ to 1 mol/L, still more preferably $1.0 \times 10^{-2}$ to $1.0 \times 10^{-1}$ mol/L.

The temperature of the acid solution is preferably 40° C. or more, more preferably 50° C. or more, still more preferably 60° C. or more, because the defective region can be mended effectively and efficiently. Also, the temperature is preferably 90° C. or less, more preferably 80° C. or less, still more preferably 60° C. or less, from the viewpoint of preventing sintering of the Pt/Pd catalyst particle, aggregation of the supported catalyst, etc.

The time for bringing the supported catalyst into contact with the acid solution can be appropriately determined depending on the type or concentration of the acid, the temperature of the acid solution, etc. For example, it can be about 30 minutes to 2 hours.

The Ms/Mc ratio can be also controlled by the method for combining two or more kinds of acid and controlling the ratio of them, the method for controlling the atmosphere of the acid solution by bubbling or the like, etc., other than the concentration of the acid solution, the temperature of the same, the type of the acid, the contact time, etc.

Examples of the method for optimizing the acid treatment conditions include the method for evaluating catalytic activity by a rotating disk electrode (hereinafter may be referred to as RDE) method.

No particular limitation is imposed on the method for bringing the supported catalyst, in which the Pt/Pd catalyst particle is supported by an electroconductive carrier, into contact with the acid solution. From the viewpoint of sufficient progress of the acid treatment, the method for immersing the supported catalyst in the acid solution is preferred. During the immersion, it is preferable to disperse and stir the acid solution by means of an ultrasonic homogenizer, a magnetic stirrer, a motor furnished with stirring vanes, etc.

[Firing Step]

The firing step is a step of firing the supported catalyst, in which the Pt/Pd catalyst particle is supported by an electroconductive carrier, at a temperature of 80° C. or more and less than 200° C. in a reducing gas atmosphere after the acid treatment step.

The type, concentration and so on of the reducing gas atmosphere are not particularly limited as long as the reducing gas atmosphere contains a reducing gas. An example of the reducing gas is $H_2$ gas.

The concentration of the reducing gas atmosphere is preferably 1 vol % or more, particularly preferably 2.5 vol % or more, from the viewpoint of efficient removal of the oxide coating.

The firing temperature is only needed to be in the range of 80° C. or more and less than 200° C. From the viewpoint of Pt surface diffusion initiating energy, it is preferably 90° C. or more, preferably 100° C. or more. Also from the viewpoint of maintaining the core-shell structure, it is preferably 170° C. or less, particularly preferably 150° C. or less.

The firing time can be appropriately determined depending on the firing temperature, the amount of a sample, etc. For example, it can be about one to three hours.

[Other Steps]

In addition to the above-described preparation step, acid treatment step and firing step, the catalyst production method of the present invention can include other steps. Examples of the other steps include a washing step and a drying step.

The washing step is conducted in order to remove the acid of the acid solution from the supported catalyst subjected to the acid treatment step. The washing method is not particularly limited as long as it can remove acid. For example, there may be mentioned a method for washing the supported catalyst with ultrapure water after the supported catalyst was subjected to the acid treatment and then filtrated. The washing with ultrapure water is preferably conducted until the washing water becomes neutral.

After the washing step, the washing water can be removed from the supported catalyst by a drying step. The drying method is not particularly limited. For example, there may be used a known method such as drying under reduced pressure, drying by heating, drying by heating under reduced pressure, etc.

The catalyst production method of the present invention preferably comprises the step of bubbling a hydrogen gas into a solution in which the supported catalyst is dispersed, after the acid treatment step and before the firing step. The oxide coating on the surface of the supported catalyst can be effectively removed in the firing step by providing such a bubbling step and thus adsorbing hydrogen onto the surface of the supported catalyst subjected to the acid treatment.

The solution used to dissolve the supported catalyst therein, is not particularly limited and can be appropriately selected. A preferred solution is an acid solution. As the acid solution, there may be used one which is the same as the acid solution used in the acid treatment.

The concentration of the hydrogen gas is not particularly limited. For example, it can be about 10 to 90 vol %. The time for bubbling the hydrogen gas can be appropriately determined depending on the hydrogen gas concentration, the amount of the supported catalyst to be processed, etc. For example, it can be about 0.5 to 1 hour.

In the case of including the bubbling step, it is preferable to provide the washing step as described above before bubbling.

Before bubbling the hydrogen gas, it is preferable to bubble an inert gas into the solution in which the supported catalyst is dispersed. This is because it is possible to increase safety during the hydrogen gas bubbling. From the same viewpoint, it is preferable to bubble an inert gas after the hydrogen gas bubbling. As the inert gas, a common gas such as nitrogen gas or argon gas can be used. The bubbling time and so on can be appropriately determined.

It is also preferable to provide washing and drying steps as described above again after the hydrogen gas bubbling. This is because it is possible to conduct the successive firing step, efficiently.

In the catalyst for fuel cells obtained by the above-described production method of the present invention, the coverage of the Pd core (core particle) with the Pt shell (outermost layer) is preferably in the range of 0.95 to 1. This is because it is possible to prevent Pd elution in usage.

Here, "the coverage of the core particle with the outermost layer" means the ratio of the surface area of the core particle covered with the outermost layer provided that the total surface area of the core particle is 1. An example of the method for calculating the coverage is that a few points on the surface of the Pt/Pd catalyst particle are observed by TEM to calculate the ratio of the area of the core particle, which has been found to be covered with the outermost layer by the observation, to the observed total area of the core particle.

In the catalyst for fuel cells obtained by the production method of the present invention, the Pt shell of the Pt/Pd catalyst particle is preferably a monoatomic layer. This is because there are such advantages that the catalytic performance of the outermost layer is extremely higher than the case where the outermost layer comprises two or more atomic layers, and that the amount of the outermost layer covering the core particle is small, resulting in low material costs.

Also in the catalyst for fuel cells obtained by the production method of the present invention, the average particle diameter of the Pt/Pd catalyst particles is preferably 3 to 10 nm, particularly preferably 4 to 6 nm.

EXAMPLES

Hereinafter, the present invention will be explained in detail, using examples and comparative examples. However, the present invention is not limited to these examples only.

[Reference Experiment]

First, a supported catalyst in which a Pt/Pd catalyst particle is supported by a carbon particle (electroconductive carrier) was prepared (hereinafter may be referred to as Pt/Pd/C supported catalyst).

Next, as shown in Table 1, the Pt/Pd/C supported catalyst was fired at 100 to 300° C. in a hydrogen gas atmosphere or in the air, thus obtaining samples 2 to 7.

The unfired sample 1 and the fired samples 2 to 7 were analyzed by X-ray diffraction (XRD).

Figure 3:
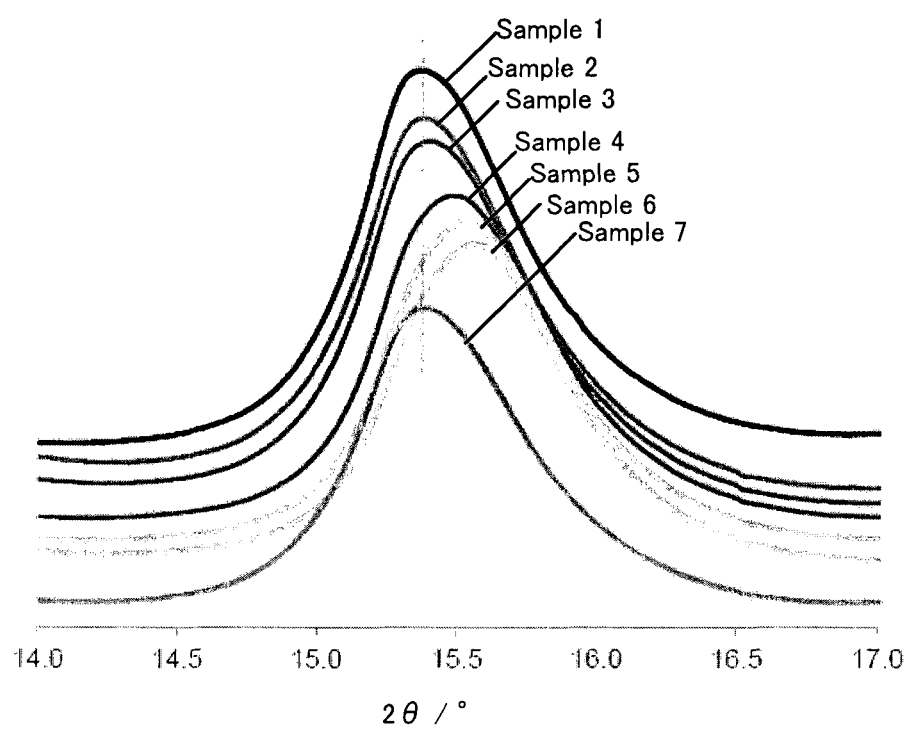
FIG. 3 shows the results of X-ray diffraction analysis of reference examples.

The results are shown in FIG. 3.

TABLE 1

| Sample No. | Firing Atmosphere | Firing Temperature [° C.] |
| --- | --- | --- |
| 1 | — | — |
| 2 | $H_2$ | 100 |
| 3 | $H_2$ | 150 |

TABLE 1-continued

| Sample No. | Firing Atmosphere | Firing Temperature [° C.] |
|---|---|---|
| 4 | $H_2$ | 200 |
| 5 | $H_2$ | 250 |
| 6 | $H_2$ | 300 |
| 7 | In the air | 150 |

As is clear from FIG. 3, the peak positions of the samples 2, 3 and 7, which were fired at less than 200° C., correspond to the peak position of the unfired sample 1. In contrast, the peak positions of the samples 4 to 6, which were fired at 200° C. or more, are shifted to a high-angle side and determined that they were alloyed.

That is, it was found that when the Pt/Pd catalyst particle is heated to 200° C. or more, Pt and Pd are alloyed; however, when the Pt/Pd catalyst particle is heated at less than 200° C., the particle maintains the core-shell structure. It was also found that in the Pt/Pd catalyst particle, alloying of Pt and Pd does not progress at less than 200° C. in not only a reducing gas atmosphere such as $H_2$ gas atmosphere, but also even in an oxidizing atmosphere such as in the air.

Production of a Catalyst for Fuel Cells

Example 1

First, a supported catalyst in which Pt/Pd catalyst particle is supported by a carbon particle (electroconductive carrier) was prepared (Pt/Pd/C supported catalyst).

Next, 1 g of the Pt/Pd/C supported catalyst and ultrapure water (specific resistance: 18 MΩcm) were dispersed by an ultrasonic homogenizer. Concentrated nitric acid was added to the thus-obtained dispersion liquid to prepare a 100 mL dispersion liquid having a nitric acid concentration of 1 mol/L.

With mixing the thus-obtained dispersion liquid by an ultrasonic homogenizer, the liquid was heated to 60° C. and kept at 60° C. for 30 minutes, thereby performing an acid treatment on the supported catalyst.

After the acid treatment, the dispersion liquid was filtrated, and the thus-obtained powdery solid was washed with ultrapure water until the filtrate becomes neutral.

Then, the thus-obtained powder was dispersed in 0.05 mol/L dilute sulfuric acid by an ultrasonic homogenizer. After $N_2$ gas was bubbled into the thus-obtained dispersion liquid, $H_2$ gas further bubbled thereinto for 30 minutes. Then, $N_2$ gas was bubbled thereinto again for a few minutes.

Thereafter, the dispersion liquid was filtrated, and the thus-obtained powdery solid was washed with ultrapure water until the filtrate becomes neutral.

After the washing, the solid was compressed and then dried under reduced pressure at 60° C. overnight, thus obtaining a powdery Pt/Pd/C supported catalyst.

Next, after the drying under reduced pressure, 1 g of the Pt/Pd/C supported catalyst was placed inside a firing furnace in an Ar gas atmosphere (inert gas atmosphere).

Then, the atmosphere inside the firing furnace was changed to an $H_2$/Ar atmosphere (reducing gas atmosphere) containing $H_2$ in a proportion of 2.5 vol %. After increasing the temperature of the furnace to 150° C., the temperature was kept at one hour, thereby firing the supported catalyst.

Thereafter, the inside of the firing furnace was air-cooled.

Comparative Example 1

A catalyst for fuel cells was produced in the same manner as Example 1, except that the Pt/Pd/C supported catalyst was not fired after the drying under reduced pressure.

Comparative Example 2

A catalyst for fuel cells was produced in the same manner as Example 1, except that the firing temperature was changed from 150° C. to 500° C.

Comparative Example 3

A catalyst for fuel cells was produced in the same manner as Example 1, except that the Pt/Pd/C supported catalyst was fired without conducting the acid treatment and the subsequent washing, bubbling, washing and drying under reduced pressure.

[Evaluation of the Catalyst for Fuel Cells]
(Cyclic Voltammetry Measurement)

Cyclic voltammetry (CV) measurement was performed on the catalysts of Example 1 and Comparative Example 1 produced above, in the following manner with a rotating disk electrode.

First, each of the catalysts of Example 1 and Comparative Example 1 was mixed in the following ratio: the catalyst for fuel cell:ultrapure water:ethanol=6:1:4 (by weight ratio). Moreover, 0.5 wt % of an electrolyte resin solution (DE2020CS manufactured by DuPont, electrolyte resin concentration 20 wt %) was added to the mixture and subjected to ultrasonic dispersion for five minutes.

Next, the thus-obtained catalyst ink was applied in a thickness of 10 μm on a rotating disk electrode and dried naturally.

Next, the rotating disk electrode thus produced was placed in an electrochemical cell. The electrochemical cell was furnished with a reversible hydrogen electrode (RHE) as the reference electrode and a 0.1 M aqueous solution of perchloric acid as the liquid electrolyte.

Figure 4A:
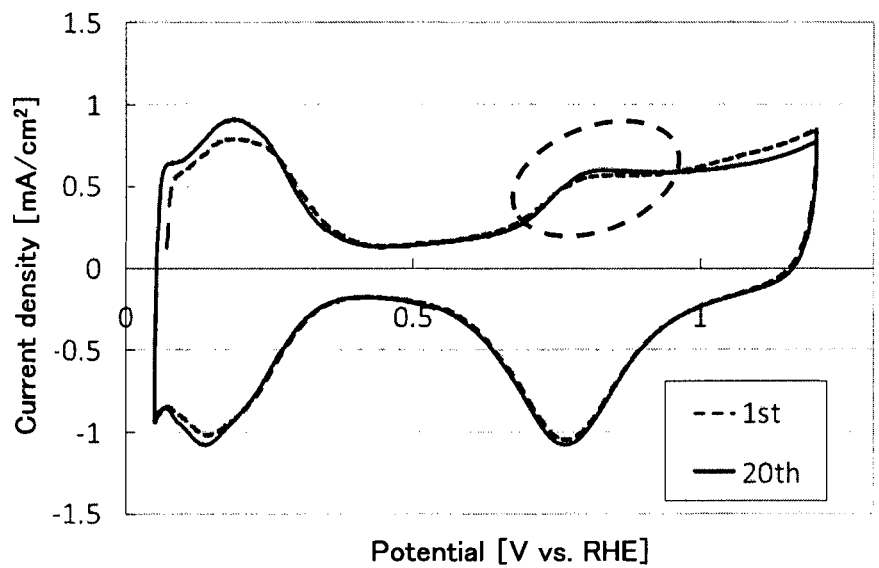
FIG. 4A shows the result of cyclic voltammetry measurement of Example 1.
Figure 4B:
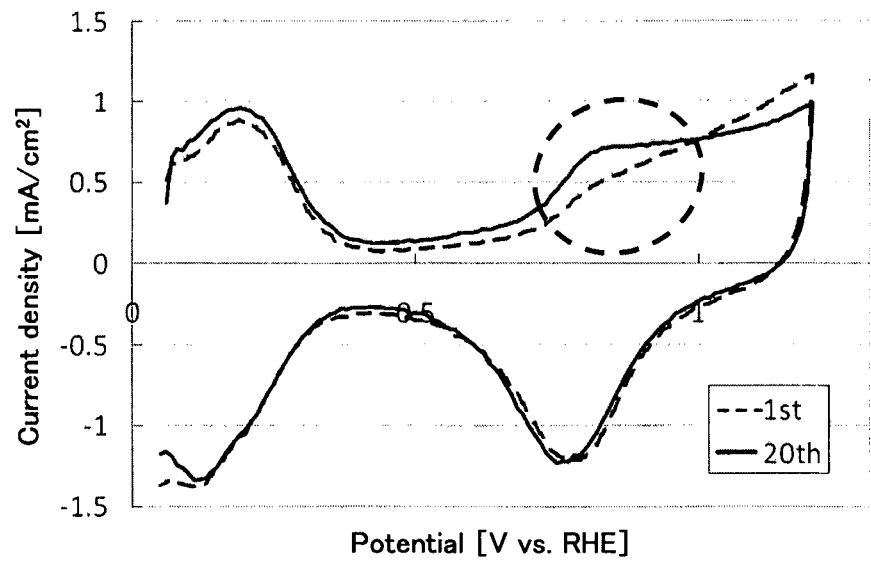
FIG. 4B shows the result of cyclic voltammetry measurement of Comparative Example 1.

The liquid electrolyte was saturated with Ar gas and 20 cycles of potential scan were performed in the condition of an initial potential of 0.5 V (vs. RHE, the same shall apply hereinafter) a switching potential of 1.2 V and a scan rate of 50 mV/sec. The results are shown in FIG. 4A and FIG. 4B. FIG. 4A shows the results of Example 1, while FIG. 4B shows the results of Comparative Example 1.

In FIG. 4A and FIG. 4B, the peak near 0.8 V shown in a dashed-line circle is associated with oxide formation on the surface of the platinum of the Pt/Pd catalyst particle. The waveform of Example 1 at the 20th cycle is about the same as that of Comparative Example 1. For the peaks shown in the circle, Comparative Example 1 is that the peak of the first cycle is smaller (smoother) than the peak of the 20th cycle, while Example 1 is that the peak of the 20th cycle is about the same as the peak of the first cycle. That is, the oxide formation peak of Example 1 at the first cycle is larger than that of Comparative Example 1 at the first cycle.

This is believed to be due to the following reason: in the catalyst for fuel cells of Comparative Example 1, oxide had been already formed on the surface of the platinum and the amount of newly formed oxide was small; however, in the catalyst for fuel cells of Example 1, the amount of the oxide which had been already formed on the surface of the platinum was smaller than Comparative Example 1 and there were many catalytic sites, so that a large amount of oxide was newly formed.

From the above results, it was confirmed that the oxide coating was removed from the catalyst of Example 1 by the firing step.

(CO Stripping Measurement)

CO stripping measurement was performed in the manner explained below with a rotating disk electrode, on the following: the catalyst for fuel cells of Example 1 produced above; the untreated Pt/Pd/C supported catalyst used as a raw material for the catalyst of Example 1 (Comparative Example 4); a supported catalyst in which a Pt particle is supported by a carbon particle (Pt/C supported catalyst, Comparative Example 5); a supported catalyst in which a Pd particle is supported by a carbon particle (Pd/C supported catalyst, Comparative Example 6); and a mixture of a Pt/C supported catalyst and a Pd/C supported catalyst (Pt/C supported catalyst: Pd/C supported catalyst=1:1 (by weight ratio), Comparative Example 7).

CO stripping measurement is a method in which CO, which has been already adsorbed onto a catalyst, is oxidized by applying a potential to the catalyst, turned into $CO_2$ and then desorbed from an electrode. CO stripping measurement is an effective way of determining the type or condition of a material that forms the outermost surface of a catalyst because a peak position (potential) of a CO desorption current (CO oxidation current) is likely to be influenced by the type or condition of the material that forms the outermost surface of the catalyst.

First, a rotating disk electrode was produced with each catalyst in the same manner as the CV measurement.

Next, the rotating disk electrode thus produced was placed in an electrochemical cell. The electrochemical cell was furnished with a reversible hydrogen electrode (RHE) as the reference electrode and a 0.1 M aqueous solution of perchloric acid as the liquid electrolyte. $CO/N_2$ gas (CO concentration 4 vol %) was bubbled into the liquid electrolyte to adsorb CO onto the catalyst surface of the rotating disk electrode.

Then, the liquid electrolyte was saturated with Ar gas and one cycle of potential scan was performed in the condition of an initial potential of 0.5 V, a switching potential of 1.2 V and a scan rate of 50 mV/sec. The results are shown in FIG. 5.

Figure 5:
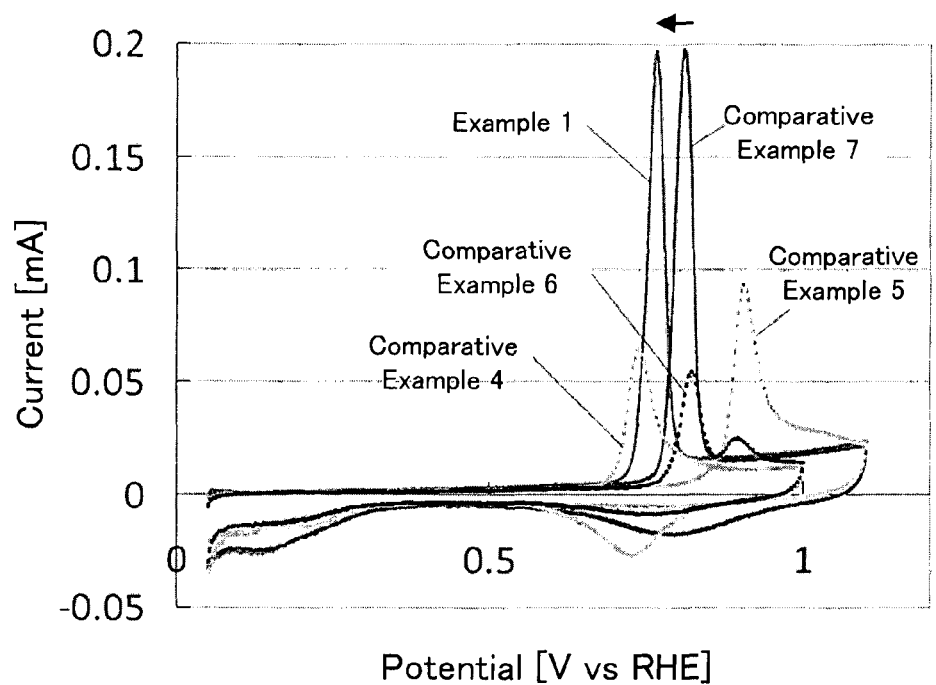
FIG. 5 shows the results of CO stripping measurement of Example 1 and Comparative Examples 4 to 7.

FIG. 5 shows that the CO desorption peak potentials of Example 1 and Comparative Example 4 are present between the CO desorption peak potential of Comparative Example 5, in which a Pt particle was supported, and that of Comparative Example 6, in which a Pd particle was supported. However, the CO desorption peak potential of Example 1, in which the acid treatment and firing were conducted, is very closer to the CO desorption peak potential of Comparative Example 5, in which a Pt particle was supported, compared to the untreated catalyst of Comparative Example 4. Since the acid treatment had a small influence on the CO stripping curves, it can be said from the comparison between Example 1 and Comparative Example 4 that surface diffusion of Pt was caused in the Pt/Pd/C supported catalyst by the firing, thus changing the structure of Pt shell (Pt outermost layer) and making it a stable structure.

The stripping curve of Comparative Example 7, which is a mixture of the Pt/C supported catalyst and the Pd/C supported catalyst, had two peaks between the CO desorption peak potential of Comparative Example 5 and that of Comparative Example 6.

(Measurement of Oxygen Reduction Reaction Activity)

Measurement of oxygen reduction reaction activity was performed in the manner explained below with a rotating disk electrode, on the above-produced catalysts for fuel cells of Example 1, Comparative Example 2 and Comparative Example 3, and the untreated Pt/Pd/C (Comparative Example 4).

First, a rotating disk electrode was produced with each catalyst in the same manner as the CV measurement and placed in an electrochemical cell. The electrochemical cell was furnished with a reversible hydrogen electrode (RHE) as the reference electrode and 0.1 M aqueous solution of perchloric acid as the liquid electrolyte.

The liquid electrolyte was saturated with Ar gas and potential scan was performed repeatedly until the waveform of cyclic voltammogram is stabilized, in the condition of an initial potential of 0.5 V, a switching potential of 1.2 V and a scan rate of 50 mV/sec. By a known method, the electrochemical surface area (ECSA) $(m^2/g_{pt})$ of the rotating disk electrode was calculated from the waveform in the finally stabilized state. The results are shown in Table 2.

Next, the liquid electrolyte was saturated with $O_2$ gas and potential scan was performed repeatedly until the waveform of cyclic voltammogram is stabilized, in the condition of an initial potential of 1.1 V, a switching potential of 0.1 V, a scan rate of 50 mV/sec and a disk electrode rotational frequency of 1600 rpm. From the waveform in the finally stabilized state, current (A) at 0.9 V was read and divided by the mass (g) of platinum contained in the disk electrode. The current per unit mass of platinum calculated in this manner $(A/g_{pt}@0.9\ V)$ was divided by the above-mentioned electrochemical surface area (ECSA) $(m^2/g_{pt})$ to calculate specific activity $(A/m^2@0.9\ V)$. The results are shown in Table 2.

The product of the thus-calculated specific activity $(A/m^2@0.9\ V)$ and electrochemical surface area (ECSA) $(m^2/g_{pt})$ was calculated; thus, mass activity $(A/g_{pt}@0.9\ V)$ was calculated. The results are shown in Table 2.

TABLE 2

| | Mass Activity [$A/g_{Pt}@0.9\ V$] | Electrochemical Surface Area [$m^2/g_{Pt}$] | Specific Activity [$A/m^2@0.9\ V$] |
|---|---|---|---|
| Example 1 | 570 | 124 | 4.6 |
| Comparative Example 2 | 230 | 110 | 2.1 |
| Comparative Example 3 | 430 | 111 | 3.9 |
| Comparative Example 4 | 430 | 114 | 3.8 |

As shown in Table 2, compared to Comparative Example 4 (untreated Pt/Pd/C supported catalyst), Example 1 (Pt/Pd/C supported catalyst fired at 80° C. or more and less than 200° C. after the acid treatment) was excellent in any of mass activity, electrochemical surface area and specific activity.

In contrast, it was found that Comparative Example 2 (Pt/Pd/C supported catalyst fired at 200° C. or more after the acid treatment) showed a marked decrease in activity, compared to the untreated Comparative Example 4. This is believed to be because, due to the firing at a high temperature of 200° C. or more, the Pt/Pd catalyst particle could not maintain the core-shell structure and was alloyed.

Comparative Example 3 (Pt/Pd/C supported catalyst fired at 80° C. or more and less than 200° C., without performing the acid treatment) showed activities and electrochemical surface area which are similar to those of the untreated Comparative Example 4. From this result, it was found that it is not possible to obtain sufficient activity-increasing effects even by firing at 80° C. or more and less than 200° C. in a reducing gas atmosphere, in the state where no acid treatment has been conducted, that is, in the state where there is a Pd core not covered with a Pt shell (Pt outermost layer).

(Evaluation of Membrane Electrode Assembly)

A membrane electrode assembly was produced in the following manner, using each of the catalysts for fuel cells of Example 1 and Comparative Examples 1 and 3, and the untreated Pt/C supported catalyst of Comparative Example 4, which were produced above. Then, the thus-produced electrode assemblies were evaluated.

<Production of Membrane Electrode Assembly>

Each of the catalysts of Example 1 and Comparative Examples 1, 3 and 4 was mixed with ultrapure water, ethanol and an electrolyte resin solution (DE2020CS manufactured by DuPont, electrolyte resin concentration 20 wt %) by centrifugal stirring at the following ratio: catalyst for fuel cells: ultrapure water:ethanol:electrolyte resin=0.9:14.24:8.16:1.9 (by weight ratio), thus obtaining a catalyst ink for cathode.

On the other hand, the Pt/C supported catalyst was mixed with ultrapure water, ethanol and an electrolyte resin solution (DE2020CS manufactured by DuPont, electrolyte resin concentration 20 wt %) by centrifugal stirring at the following ratio: Pt/C supported catalyst:ultrapurewater:ethanol:electrolyte resin=0.9:14.24:8.16:1.9 (by weight ratio), thus obtaining a catalyst ink for anode.

The catalyst ink for cathode was applied to a first surface of an electrolyte membrane (NR211 manufactured by DuPont) and dried, while the catalyst ink for anode was applied to a second surface of the electrolyte membrane and dried, thus obtaining a membrane catalyst layer assembly in which an anode catalyst layer, the electrolyte membrane and a cathode catalyst layer were stacked in this order. The amount of the applied catalyst ink for cathode was 0.1 mg-Pt/cm$^2$, while the amount of the applied catalyst ink for anode was 0.05 mg-Pt/cm$^2$.

Next, the membrane catalyst layer assembly was sandwiched between two gas diffusion layer sheets (PYROFIL manufactured by Mitsubishi Rayon Co., Ltd.) and pressured. Membrane electrode assemblies of Example 1 and Comparative Examples 1, 3 and 4 were produced in this manner.

<Evaluation of Membrane Electrode Assembly>

Discharge performance evaluation was performed in the following manner on the above-produced membrane electrode assemblies of Example 1 and Comparative Examples 1, 3 and 4.

| | |
|---|---|
| Cell temperature: | 80° C. |
| Reaction gas dew point: | Anode 90° C. |
| | Cathode 90° C. |
| Reaction gas flow rate: | Anode (H$_2$ gas) 0.5 L/min |
| | Cathode (Air) 1.0 L/min |
| Back pressure: | Anode 0.093 MPa-G |
| | Cathode 0.093 MPa-G |
| Sweep range: | 0.2 V → Open voltage |
| Sweep rate: | 5 mV/sec |

Figure 6:
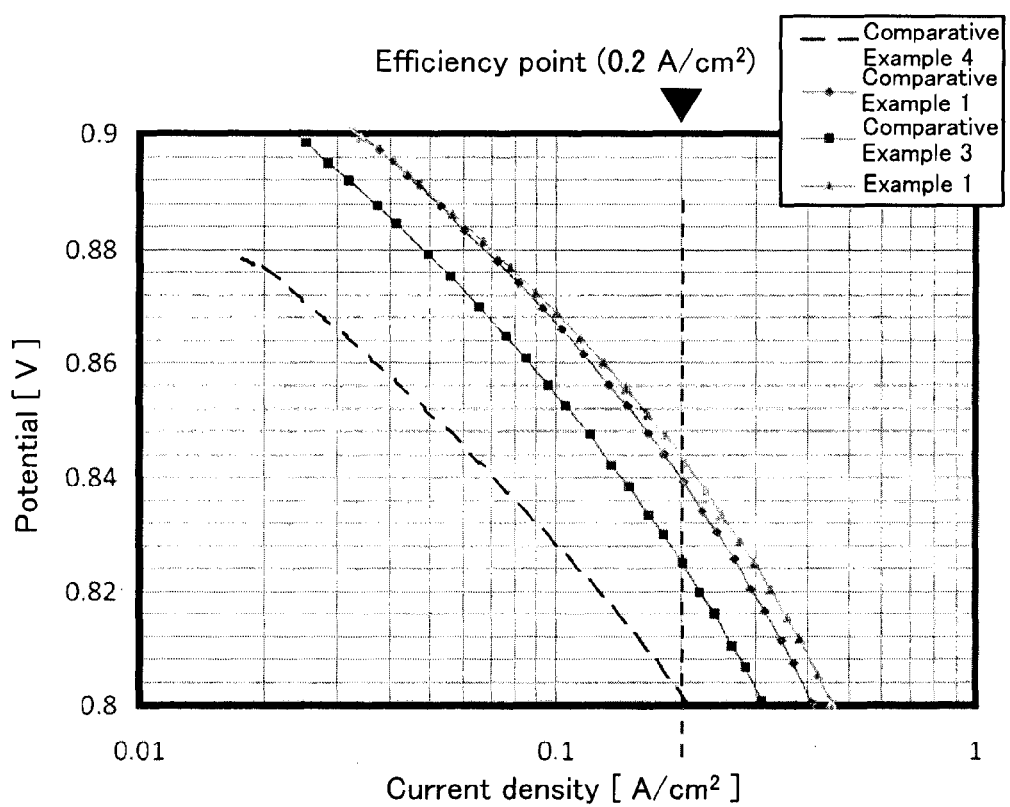
FIG. 6 shows the evaluation results of membrane electrode assemblies of Example 1 and Comparative Examples 1, 3 and 4.

The results are shown in FIG. 6. In FIG. 6, current and potential are each a value converted into a value per gram of platinum.

It is clear from FIG. 6 that Example 1 and Comparative Examples 1 and 3, each supporting the Pt/Pd catalyst particle, are excellent in discharge performance per unit mass of platinum, compared to Comparative Example 5 supporting the Pt particle. It is also clear from the comparison between the potential of Example 1 and those of Comparative Examples 1 and 3 at 0.2 A/cm$^2$, that Example 1, which was subjected to the acid treatment and then the firing, showed higher potential than Comparative Example 3, which was subjected to the firing only, and Comparative Example 1, which was subjected to the acid treatment only.

The current of 0.2 A/cm$^2$ is a value which is included in the current range that is most-used in automobile fuel cells, and the fact that discharge potential is high at 0.2 A/cm$^2$ means that the catalyst of the present invention exhibits excellent performance in automobile fuel cells.

REFERENCE SIGNS LIST

1. Pt/Pd catalyst particle
2. Pd core
3. Pt shell
3a. Defective region
4. Supported catalyst
5. Electroconductive carrier
6. Oxide coating

The invention claimed is:

1. A method for producing a catalyst for fuel cells, in which a catalyst particle is supported by an electroconductive carrier, the method comprising the steps of:
   preparing a supported catalyst in which a catalyst particle comprising a core particle and an outermost layer is supported by an electroconductive carrier, the core particle comprising at least one of palladium and a palladium alloy, and the outermost layer comprising at least one of platinum and a platinum alloy and covering the core particle;
   acid treatment to bring the supported catalyst into contact with an acid solution which dissolves palladium more preferentially than platinum; and
   firing the supported catalyst at 100° C. or more and less than 200° C. in a reducing gas atmosphere after the acid treatment step.

2. The method for producing the catalyst for fuel cells according to claim 1, further comprising the step of bubbling a hydrogen gas into a solution in which the supported catalyst is dispersed, after the acid treatment step and before the firing step.

3. The method for producing the catalyst for fuel cells according to claim 2, wherein the solution in which the supported catalyst is dispersed is an acid solution in the bubbling step.

4. The method for producing the catalyst for fuel cells according to claim 1, wherein the acid solution contains at least one kind of acid selected from the group consisting of nitric acid, sulfuric acid, perchloric acid, hydrochloric acid and hypochlorous acid in the acid treatment step.

5. The method for producing the catalyst for fuel cells according to claim 1, wherein the acid solution is heated to 40 to 90° C. in the acid treatment step.

* * * * *